(12) United States Patent
Walter

(10) Patent No.: US 7,170,037 B2
(45) Date of Patent: Jan. 30, 2007

(54) INDENTIFICATION SYSTEM FOR INSERT ELEMENTS FOR TEMPERING FOODS ACCOMMODATED IN CONTAINERS

(76) Inventor: Hubert Eric Walter, Gluckstrasse 3, Neu Ulm (DE) 89231

( * ) Notice: Subject to any disclaimer, the term of this patent is extended or adjusted under 35 U.S.C. 154(b) by 23 days.

(21) Appl. No.: 10/492,223

(22) PCT Filed: Oct. 8, 2002

(86) PCT No.: PCT/DE02/03835

§ 371 (c)(1),
(2), (4) Date: Apr. 8, 2004

(87) PCT Pub. No.: WO03/032790

PCT Pub. Date: Apr. 24, 2003

(65) Prior Publication Data

US 2004/0237797 A1  Dec. 2, 2004

(30) Foreign Application Priority Data

Oct. 10, 2001  (DE) ................................ 101 50 949

(51) Int. Cl.
*H05B 6/12* (2006.01)
*H05B 6/06* (2006.01)
*A47J 39/02* (2006.01)

(52) U.S. Cl. ...................... 219/622; 219/626; 219/663; 219/665; 219/518; 99/451

(58) Field of Classification Search ........ 219/620–627, 219/661–668, 386, 518; 99/325–334, DIG. 14, 99/451

See application file for complete search history.

(56) References Cited

U.S. PATENT DOCUMENTS 4,447,691 A * 5/1984 Mizukawa et al. ......... 219/626
5,628,241 A   5/1997 Chavanaz et al. ............ 99/331
5,893,996 A   4/1999 Gross et al. ................. 219/452
5,968,398 A   10/1999 Schmitt et al. .............. 219/626
6,281,611 B1  8/2001 Chen et al. .................. 310/171

FOREIGN PATENT DOCUMENTS

| DE | 19540408 | 5/1997 |
| DE | 19754851 | 6/1999 |
| DE | 19818831 | 10/1999 |
| EP | 1087641  | 3/2003 |

* cited by examiner

*Primary Examiner*—Philip H. Leung
(74) *Attorney, Agent, or Firm*—Young Basile

(57) ABSTRACT

The invention relates to an identification system for insert elements for tempering food accommodated in containers. Advantageously, the invention can be used in particular for short-term, economic and high-quality heating of prefabricated food wherein heating can be preferably carried out in induction ovens. According to the object, the respective configuration and if possible also the equipment with containers of such an insert element shall be allowed to be recognized and taken into consideration for tempering. At the same time, the insert elements have definitely arranged containers which can be fixed in receiving means. An appropriately equipped insert element can be introduced into an induction oven or a cooling device wherein the containers of a horizontal plane are positioned at the same time. According to the invention, at least one electromagnetically or magnetically detectable element is mounted on the insert elements each in a predeterminable position. On the inner wall of an induction oven, in parallel with horizontal planes or with the horizontal planes of a cooling device, at least two detectors or detector units coupled with a control for induction coils or for the heat removal capacity of a cooling device are arranged for electrically, magnetically detectable elements.

20 Claims, 1 Drawing Sheet

INDENTIFICATION SYSTEM FOR INSERT ELEMENTS FOR TEMPERING FOODS ACCOMMODATED IN CONTAINERS

BACKGROUND OF THE INVENTION

The invention relates to an identification system for insert elements for tempering, and preferably for inductive heating of food accommodated in containers. The invention can be advantageously used in particular for short-term, economic and high-quality heating of prefabricated food fit to eat. It is especially advantageous that the solution according to the invention can be used in induction ovens.

Suitable embodiments of such induction ovens are described in DE 198 18 831 A1.

At the same time, one or a plurality of induction coils are provided in several horizontal planes arranged on top of each other, wherein the number of induction coils per plane can be varied and chosen respectively.

The containers in which the food shall be heated are made of a material suited for inductive heating, and are coated respectively at least with such a material or they include such a material.

Because inductive heating is allowed to be achieved most effective if the particular containers will be positioned as best as possible relative to the arrangement of the respective induction coils it would be a good idea either to dimension the particular containers appropriately or to choose their shape such that this can be achieved.

But since for this an increased amount of work involved is required, and in particular a hazard potential is given as well with the containers being hot by heating, it is more favourable to use insert elements having necessary receiving means for such containers. The receiving means can be carried out in the form of appropriately formed depressions and recesses as well, into which the particular containers can be inserted. Such an insert element can then be introduced through the open door of an induction oven, and can be positioned in close proximity on a plane and in a low distance above such a plane respectively in which induction coils are arranged, and can be supported in the necessary receiving means respectively on the inner wall of the induction oven.

In most cases, containers are inserted into the respective receiving means of such an insert element which are different in the particular size, on the one hand, and which concerns the food being different, on the other hand. At the same time, food is not meant to be as such per se, however, for example drinks are meant to be as well. Containers or receiving means for water shall also come under, wherein the water is inductively heated and vaporized whereby the time and power required for heating food can be reduced and the quality of food can be improved.

The insert elements are previously equipped with the containers before real heating, and are fed into the induction oven shortly before consumption wherein heating the food can then be achieved within a very short time, i.e. within a few minutes.

However, problems result from the previous equipment of the insert elements, and from the containers to be used in a different manner. Thus, for example, containers can find use which dimensions thereof are so great such that an effective short time heating is not attainable by means of a single induction coil such that relevant positioning, for example, with respect to such two induction coils should take place.

Another problem which has to be taken into consideration due to the previously equipment with different containers in such insert containers is in that the equipment is also provided with containers wherein the food and drinks respectively are contained, which should not be heated and which is the case with the most different salads, for example.

Of course, one or several receiving means inside an insert element may also remain empty such that one or else several induction coils arranged relative to such a receiving means should remain switched off during operation of the induction oven as well.

Thus, it is required with the use of previously equipped insert containers for heating food to carry out a selective calculated turn-on of specific induction coils within the particular horizontal planes while considering the respective insert container and the equipment thereof respectively. This fact should be allowed to be taken into consideration already after closing the door of the induction oven, thus before actual heating the food.

SUMMARY OF THE INVENTION

Therefore, it is an object of the invention to propose an identification system for insert elements by means of which the particular configuration and also the equipment with containers of such an insert element as the case may be can be recognized and taken into consideration.

According to the invention, this object is solved with an identification system for insert elements for tempering food accommodated in containers, in which a plurality of said containers are arranged in a locally defined manner in receiving means provided in said insert elements, and said insert elements equipped with said containers are introduced into an induction oven or a cooling device, and at the same time said containers will be positioned relative to a plurality of induction coils arranged in at least one horizontal plane inside said induction oven, characterized in that at least one electromagnetically or magnetically detectable element is mounted in a predeterminable position each on said insert elements, and in that at least two detectors or detector units coupled with a control for said induction coils or said heat removal capacity of said cooling device are arranged on the inner wall of said induction oven in parallel with horizontal planes having said induction coils or with horizontal planes of said cooling device relative to predeterminable positions for said electromagnetically detectable elements. Advantageous embodiments of the invention can be achieved with further features. An advantageous process control can also be achieved according to the present invention.

DETAILED DESCRIPTION OF THE PREFERRED EMBODIMENT

Figure 1:
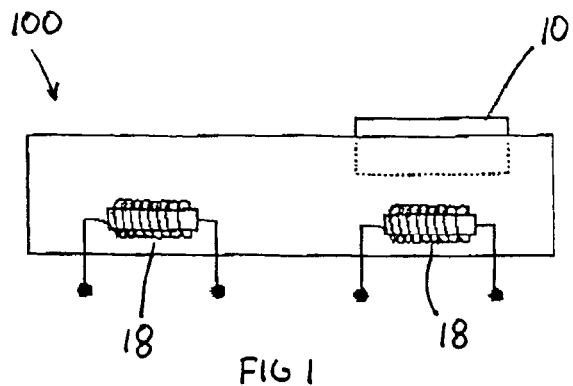
FIG. 1 is a schematic drawing of a front view of one embodiment of a detector according to the present invention.
Figure 2:
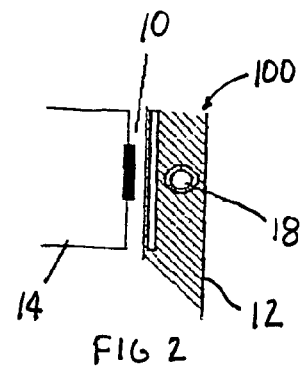
FIG. 2 is a schematic drawing of the side view of the detector shown in FIG. 1.
Figure 3:
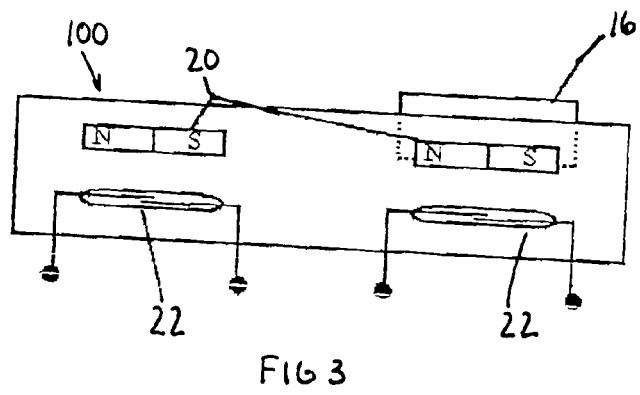
FIG. 3 is a schematic drawing of the front view of a second embodiment of the detector.
Figure 4:
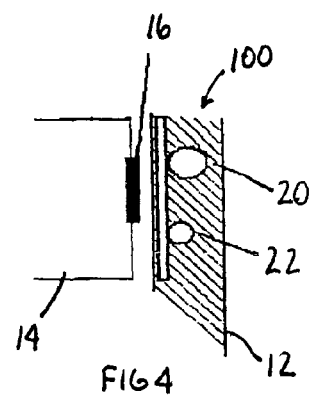
FIG. 4 is a schematic drawing of the side view of detector shown in FIG. 3.
Figure 5:
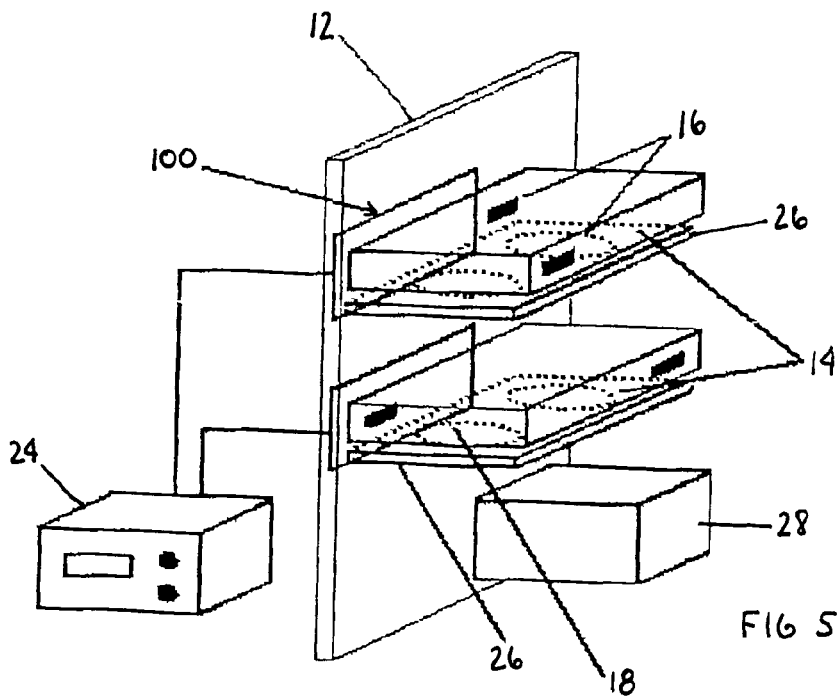
FIG. 5 is a schematic drawing of a third embodiment of the detector.

Referring to the FIGS. 1–5, with the identification system according to the invention, at least one electromagnetically or magnetically detectable element 10 is mounted each in predeterminable positions on these insert containers 14. Two or a plurality of such electromagnetically or magnetically detectable elements 10 (information content of 1 bit each) preferably are to be mounted on external edge-sided front surfaces of the insert elements 14 wherein specific minimum clearances, for example at least distances of 20 mm should be kept. For mounting these detectable elements 10, in particular the lateral front surfaces of the insert elements 14 are obvious which are aligned in parallel with the lateral inner walls 12 of the induction oven (not shown). Likewise, it is also possible to choose other arrangements for these elements such as top face elements, bottom elements or grip elements.

Also, for this the rearward front surface of the insert elements can be used.

Considering the predetermined positions of such electromagnetically detectable elements on the insert containers, with the identification system according to the invention, detectors or detector units are used which are arranged on the insert elements on and within the wall of the induction oven respectively in accordance with the predeterminable positions of the electromagnetically detectable elements. These detectors or detector units are coupled with the control for the induction coils such that selective turn-on of merely selected induction coils in the particular horizontal plane can take place considering the particular insert element and its equipment respectively, whereas other induction coils which are arranged relative to areas of the insert element in which no containers containing food or containers containing food and drinks, respectively which shall not be heated remain switched-off. Likewise, a selective power control of the individual induction coils can take place only or in addition.

It is certainly suitable for the insert elements to be formed from material which cannot be inductively heated.

For this, the different plastic materials as well as non-ferromagnetic materials such as aluminum suggest themselves.

Electromagnetically or magnetically detectable elements made of a ferromagnetic material can then be attached to such insert elements 14, in particular in positions which consider the arrangement of the detectors and detector units, respectively. For example, the elements can be used with a ferromagnetic material such as sheet steel 16 preferably with dimensions which are known in particular with respect to the width and height of such sheet steel 16. In such elements, recesses can also be formed, e.g. in the form of slots and holes which may then fulfil the operation of detectable elements. Likewise, such recesses may also fulfil the operation of the electromagnetic or magnetic elements when such an insert element is made as a whole or partially of a ferromagnetic material.

However, electromagnetically detectable elements can also be electromagnets, e.g. electromagnetic coils (preferably flat coils) 18. Likewise, permanent magnets 20 can be mounted as electromagnetically or magnetically detectable elements on the insert elements 14.

Considering the electromagnetically detectable elements provided on the insert elements, dry-reed contacts 22 can then also be used as detectors.

If so-called detector units 100 are used, such a detector unit can be formed of each at least one, however preferably two or a plurality of permanent magnets 20 and one dry-reed contact 22. In that case of using two permanent magnets 20, these should be arranged at the same distances on two sides opposing each other of such a dry-reed contact 22, and if possible, one alignment of the poles should be chosen. This can be achieved with two permanent magnets arranged in the same pole alignment, e.g. or with electromagnets connected in a corresponding manner. However, instead of the permanent magnets 20, induction coils 18 can also be used.

For the identification of the particular insert element, the electromagnets or induction coils can be merely switched on in short time for detection, and identification can take place by identification of the electromagnetically detectable element being either available or not available such that the identification and influence respectively cannot take place permanently.

Regardless whether a detector unit is using permanent magnets 20 or induction coils 18, the magnetic field will be influenced by the existence of an electromagnetically or magnetically detectable element, and because of this influence the particular dry-reed contact 22 will be closed or opened. By closing and opening the contact respectively, correlative signals will be transmitted to the control for switching on and for remaining switched off the individual induction coils and/or the selective power control 24 thereof.

As already mentioned, one electromagnet each preferably one induction coil can be used as a detector as well wherein a ferromagnetic material or else a particular coil are again usable on the insert element as an electromagnetically detectable element.

A voltage is applied short-time to such a coil forming the real detector such that an electric voltage is induced and an electromagnetic field is established in the electromagnetically detectable element. After switching off the detector coil, likewise a voltage is induced in that coil according to Lenz's law if an electromagnetically detectable element is arranged in the electromagnetic field, so on the particular insert container in the particular position for this detector such that this can also be used as a signal for switching on and remaining switched off of specific induction coils.

Furthermore, with the induction ovens in which a plurality of horizontal planes 26 positioned one upon each other are provided with induction coils it is advantageous to arrange the detector units with permanent magnets 20 or electromagnetic coils 18 such that with the detector units 100 of each immediately adjacent horizontal planes 26 a polarity each, which is shifted 180 degrees, will be selected in order to largely avoid the mutual influence of the magnetic and electromagnetic fields of these planes, respectively.

For avoiding and reducing the influence of detectors or detector units of adjacent horizontal planes, respectively such detectors or detector units each are allowed to be alternately positioned on inner walls 12 opposing each other or being different.

The electromagnetically detectable elements on the insert elements should be arranged thereon if possible, such that clearances toward each detectors and detector units, respectively will not be greater than 30 mm, preferably smaller than 20 mm, most preferable smaller than 10 mm.

Furthermore, it is advantageous if the permanent magnets or else the induction coils used for the detectors and detector units each are equipped with a magnetic and electromagnetic shielding, respectively. This shielding should ensure that the magnetic fields or electromagnetic fields completely and in a highly attenuate form respectively do not influence the environment of the induction oven and that they will be maintained inside the induction oven. Advantageously, such a shielding is also formed as a so-called reflector such that the flux lines will be preferably aligned towards the electromagnetically detectable elements to be detected, if necessary, whereby the sensitivity can be further increased.

In addition to the application of the invention described in detail with respect to the induction ovens, the use in cooling devices 28 is possible as well. At the same time, the heat removal capacity can be controlled in order to keep temperatures being specifically suitable for food or else to consider filling the cooling device 28. Automatic control 24 can also be carried out such that various horizontal planes in which the insert containers have been introduced and remained empty respectively will be appropriately cooled in an automatically controlled manner.

The solution according to the invention has distinct advantages compared with optical identification systems in particular. Thus, for example, scanner systems with so-called bar codes which are arranged on such insert elements, as the case may be, tend to contaminate such that errors of detection occur during longer operation.

Because with heating food, the formation of water vapour cannot be inevitably prevented, thus optical identification systems are allowed to be realized practically only with a highly increased cost effort.

As an equivalent identification system, mechanical systems eliminate as well due to the difficult handling ability and poor reliability during long-time operation, in particular.

The invention claimed is:

1. An identification system for an induction oven for tempering food accommodated in containers, said system comprising;
    the induction oven;
    a plurality of induction coils arranged in at least one horizontal plate inside the induction oven;
    at least two detectors coupled with a control for said induction coils arranged on an inner wall of said induction oven parallel with the at least one horizontal plane;
    insert elements having receiving means provided in the insert elements wherein a plurality of the containers are arrangeable in the receiving means; said insert elements having at least one detectable element mounted in a predetermined location on each of the insert elements, wherein the at least one detectable element is one of an electromagnetically detectable element and a magnetically detectable element, and wherein the at least two detectors are positioned at predetermined locations from the at least one detectable element for detecting the presence of the insert elements.

2. Identification system according to claim 1, characterized in that said at least one detectable element is made of a ferromagnetic material.

3. Identification system according to claim 2, characterized in that said at least one detectable element is a steel plate having known dimensions.

4. Identification system according to claim 3, characterized in that recesses are formed in predeterminable positions in said at least one detectable element.

5. Identification system according to claim 1, characterized in that said at least one detectable element is one of a coil and a permanent magnet.

6. Identification system according to claim 1, characterized in that said at least one detectable element is arranged on outer edges of said insert elements.

7. Identification system according to claim 1, characterized in that said detectors are dry-reed contacts.

8. Identification system according to claim 1, characterized in that said detectors are electromagnets.

9. Identification system according to claim 8, characterized in that said detectors are coils.

10. Identification system according to claim 1, characterized in that said detectors are formed from at least one of an electromagnet and permanent magnet each and from said one dry-reed contact.

11. Identification system according to claim 10, characterized in that said detectors are made each of said one dry-reed contact and at least two of permanent magnets.

12. Identification system according to claim 11, characterized in that the polarity of said permanent magnets is equal.

13. Identification system according to claim 12, characterized in that said polarity of said permanent magnets on said adjacent horizontal planes with said induction coils is rotated 180° each to one another.

14. Identification system according to claim 10, characterized in that said detectors are made each of said on dry-reed contact and at least two electromagnets.

15. Identification system according to claim 14, characterized in that the polarity of the electromagnets is equal.

16. Identification system according to claim 1, characterized in that said detectors are made each of one dry-reed contact and at least one coil.

17. Identification system according to claim 1, characterized in that said insert elements are formed from a non-ferromagnetic material.

18. Identification system according to claim 1, characterized in that a magnetic shielding is provided on a side in the oven opposing said detectable elements.

19. A method for tempering food accommodated in containers using an identification system according to claim 1, comprising the steps of:
    introducing the insert element with the container containing food into the induction oven in parallel with the induction coils arranged in horizontal planes;
    determining one of the absence and presence of the detectable elements in particular positions on the insert element with the detectors;
    controlling a switching on of the induction coils for heating food from the determination of the presence of the detectable element;
    and controlling a switching off of the induction coils for heating food from the determination of the absence of the detectable element.

20. Method according to claim 19, further comprising the step of influencing a magnetic field of the detectors by the detectable element on said insert, wherein said detectors have a said dry-reed contact whereby said dry-reed contact will be one of closed and opened, and an equivalent signal is transmitted to said control for said induction coils.

* * * * *

UNITED STATES PATENT AND TRADEMARK OFFICE
CERTIFICATE OF CORRECTION

PATENT NO. : 7,170,037 B2 Page 1 of 1
APPLICATION NO. : 10/492223
DATED : January 30, 2007
INVENTOR(S) : Hatsuo Sakurazawa It is certified that error appears in the above-identified patent and that said Letters Patent is hereby corrected as shown below:

Column 5, Line 29:  Replace ";" with --:--.

Signed and Sealed this

First Day of April, 2008

JON W. DUDAS
*Director of the United States Patent and Trademark Office*